United States Patent Office

3,529,932
Patented Sept. 22, 1970

3,529,932
PROCESS FOR REMOVING TITANIUM FROM TITANIUM-CONTAINING PHOSPHORIC ACID
Riichiro Imoto, Toshio Sakomura, and Mitsuo Kikuchi, Yamaguchi-ken, Japan, assignors to Toyo Soda Manufacturing Co., Ltd., Yamaguchi-ken, Japan
No Drawing. Filed Sept. 7, 1967, Ser. No. 665,956
Claims priority, application Japan, Oct. 31, 1966, 41/71,389
Int. Cl. C01b 25/18, 25/22
U.S. Cl. 23—165        14 Claims

ABSTRACT OF THE DISCLOSURE

A method for preparing titanium-free phosphoric acid from impure wet process phosphoric acid containing titanium by adding an aliphatic alcohol as a solvent to the impure wet process phosphoric acid in the presence of trivalent iron ions whereby the phosphoric acid is dissolved in the alcohol phase and the titanium remains in the aqueous phase.

BRIEF SUMMARY OF THE INVENTION

The invention is characterized by the addition of trivalent iron ions to wet process phosphoric acid containing titanium as an impurity in order to enable separation of the phosphoric acid into an aliphatic alcohol added to the acid while the titanium remains in aqueous phase. The starting wet process phosphoric acid contains iron in an amount less than that sufficient to produce a weight ratio of iron to $TiO_2$ in the acid of at least 20.

DETAILED DESCRIPTION OF THE INVENTION

The process for the production of phosphoric acid is broadly divided into a dry process and a wet process, but most phosphoric acids in Japan are presently produced by the wet process. This wet process comprises treating phosphate rock with sulfuric acid of appropriate concentration to convert the calcium phosphate contained in the phosphate rock into a slurry of phosphoric acid and gypsum and then separating said slurry by filtration to obtain a phosphoric acid solution. The wet-process phosphoric acid produced in this way contains many impurities, and the use of the phosphoric acid is limited mainly to the production of fertilizers. In order to produce industrial phosphates as, for example, sodium tripolyphosphate, many further purifying steps are required.

In general, the impurities contained in a wet-process phosphoric acid are iron, aluminum, titanium, silica, fluorine, sulfuric acid, etc. These impurities originate both from the raw material phosphate rock and the sulfuric acid used, and the content of these impurities depends upon the quality of said raw materials. In Table 1, an example of the composition of a wet-process phosphoric acid obtained by decomposing phosphate rock with an industrially pure sulfuric acid is shown.

However, waste sulfuric acid which is discharged in the production of titanium dioxide and which contains titanium in a large amount as an impurity, is often used for the decomposition of phosphate rock.

The wet-process phosphoric acid which is obtained by using said waste sulfuric acid from the production of titanium dioxide has, by way of example, the composition shown in Table 2.

TABLE 1

| Component: | Weight, percent |
|---|---|
| $P_2O_5$ | 31.2 |
| $SO_4$ | 3.15 |
| Ca | 0.19 |
| $TiO_2$ | 0.05 |

TABLE 2

| Component: | Weight, percent |
|---|---|
| $P_2O_5$ | 30.1 |
| $SO_4$ | 2.80 |
| Ca | 0.21 |
| $TiO_2$ | 0.75 |

The wet-process phosphoric acid shown in Table 1 contains 0.160 part (all parts referred to are parts by weight) of titanium (calculated in terms of $TiO_2$) per 100 parts of $P_2O_5$, and, in the composition shown in Table 2, the acid contains 2.50 parts of titanium (calculated in terms of $TiO_2$) per 100 parts of $P_2O_5$.

A titanium containing phosphoric acid yields a precipitate of titanium phosphate when the acid is concentrated, or it develops a white-turbidity during storage of the product, or, further, titanium phosphate is precipitated in the production of phosphate therefrom. Because of the disadvantages abovementioned, such a wet process phosphoric acid is unsuitable.

In order to eliminate the above-mentioned disadvantages, it is necessary, according to the present invention, that the amount of titanium contained in the phosphoric acid be such that the amount is less than 0.005 part per 100 parts of $P_2O_5$.

It has heretofore been known that it is possible to remove the titanium in a titanium-containing phosphoric acid to some extent, by neutralizing such impure phosphoric acid by adjusting the pH thereof or by diluting said acid. However, the former is effective only in the course of the production of phosphate as sodium phosphate and cannot be resorted to for obtaining a purified phosphoric acid, and, also, the latter appears not to be industrially applicable since the acid must be diluted with a large amount of water.

On the other hand, numerous attempts to produce phosphoric acid by solvent extraction of a wet-process phosphoric acid, have been made for many years, as for example shown in U.S. Pat. No. 1,929,441. Therein is a description of a process which comprises decomposing phosphate rock with 25–93% sulfuric acid, adding an appropriate organic solvent, for example, butanol, to the reaction product to extract the phosphoric acid into the solvent phase, thereby separating it from the gypsum slurry, and obtaining said phosphoric acid from said solvent phase.

In this patent, the filterability of the gypsum is greatly improved by adding the above said organic solvent to the reaction product.

Also, it is a fact that, by solvent extraction, some impurities in the wet process phosphoric acid, for example, calcium are purified.

However, the conventional solvent extraction process does not produce a sufficiently pure product. The present inventors' research makes clear that, depending upon the kind of impurity which is to be removed, the behavior in the extraction system of the substances to be separated varies, and depending upon the extraction conditions, the partition coefficient of the impurity which is to be removed is strikingly affected.

Because of this complicated phenomenon in the solvent extraction the process for production of pure phosphoric acid by the solvent extraction of a wet-process phosphoric acid is not so easily industrialized even at the present time.

After repeated investigation of the purification of a wet-process phosphoric acid by solvent extraction, the present inventors became aware that the solvent-extraction operation is effective for removing titanium from such phosphoric acid. That is to say, the present inventors became aware that it is possible in principle to remove titanium from phosphoric acid by using, as an organic solvent, a solvent which dissolves phosphoric acid easily but dissolves water only partly and which does not dissolve titanium, thereby separating the phosphoric acid into the organic solvent phase and simultaneously retaining the titanium in the water phase.

However, through further research, the present inventors found that the greater the ability of a solvent to dissolve phosphoric acid, the more the ability to dissolve titanium increases, and, to the contrary, the smaller the ability to dissolve phosphoric acid, the more the ability to dissolve titanium decreases. For example, in an aliphatic alcohol, when hexanol having 6 carbon atoms and butanol having 4 carbon atoms are compared, butanol dissolves phosphoric acid well, but the amount of titanium dissolved is also large, whereas, in hexanol, as compared with butanol, the ability to dissolve phosphoric acid is not so great, but the amount of titanium dissolved is also small.

An organic solvent such as benzene, etc., does not dissolve titanium, but likewise it dissolves phosphoric acid only very little, thus resulting in a very low yield of phosphoric acid. An organic solvent which dissolves phosphoric acid very well and which does not dissolve titanium would be ideal, but such an organic solvent has not yet been discovered.

The present inventors conducted experiments with respect to removing titanium from a wet-process phosphoric acid by the solvent-extraction treatment, and it was discovered that for the purpose of yielding phosphoric acid it is suitable to use an organic solvent as an extracting agent, which is effective for extracting phosphoric acid. However, if the wet-process phosphoric acid is extracted by using such an organic solvent, titanium free phosphoric acid cannot be obtained.

As a result of more research, it was discovered that the partition coefficient of titanium into the organic solvent water system is greatly affected by the presence of $Fe^{3+}$. That is to say, it was found that if $Fe^{3+}$ coexists at the time of the solvent extraction of phosphoric acid, the titanium is not extracted effectively into the solvent phase, and the larger the amount of coexisting trivalent iron ion, the more striking the effect. And from this discovery, we finally accomplished the present invention, based on the principle that if the solvent extraction of a titanium-containing phosphoric acid is carried out in the presence of a coexisting trivalent iron ion, the titanium becomes difficult to extract into the solvent phase and therefore the water phase containing titanium is separated from the solvent phase containing phosphoric acid whereby there is obtained purified phosphoric acid free from titanium.

It was also discovered, as a result of research, that divalent iron ion has no such effect, whereas the trivalent iron ion alone has this peculiar effect. A theoretical explanation for this phenomenon is difficult, but it is presumed that, in the phosphoric acid solution, the $Fe^{3+}$ and titanium may form a complex compound and this compound might be very difficult to extract into the solvent phase.

This invention is explained in greater detail hereunder.

A trivalent iron-containing compound is added in advance before extraction to a wet-process phosphoric acid containing titanium, and the weight ratio of the iron and titanium (calculated in terms of $TiO_2$) in said wet-process phosphoric acid is more than 20, and preferably 50. The amount of added iron compound has no upper limit, however, adding more iron compound than will dissolve has essentially no meaning. If more iron compound is added than will dissolve, it is necessary to remove the undissolved portion by precipitation using additional apparatus. As the iron compound, any ferric salts such as ferric sulfate, ferric nitrate, ferric chloride, etc., may be used. Also, when a divalent iron compound is added or when a substance which dissolves to form a divalent iron ion is added, an appropriate oxidizing agent, for example, hydrogen peroxide, air, etc., is jointly used to convert the divalent iron ion into a trivalent iron ion. Further, the same effect is obtained by adding these iron compounds during the extraction operation without adding them to the crude phosphoric acid.

Then, an organic solvent which dissolves phosphoric acid and dissolves water only partly is added as an extracting agent to the said wet-process phosphoric acid so prepared, and the extraction is carried out to separate the solvent phase containing phosphoric acid. The extraction operation may be either a single extraction or a continuous counter-current extraction, but, industrially the latter is desirable. By this operation, the phosphoric acid is dissolved into the solvent phase, while the titanium remains in the water without being dissolved in the solvent phase and is thereby separated from the phosphoric acid.

As the organic solvent used herein, an aliphatic alcohol having 3–6 carbon atoms or a mixture thereof may be employed, but, in particular, it is preferred to use n-butanol or isoamylalcohol, etc., the ability of which to dissolve phosphoric acid is great (the partition coefficient of which is great).

Subsequently, the above-said solvent phase which contains the phosphoric acid separated almost completely from the titanium, is separated into phosphoric acid and the organic solvent by an appropriate stripping agent, for example, water. The organic solvent recovered is used again for the extraction of a wet-process crude phosphoric acid.

As mentioned above, if water is used as the stripping agent, an aqueous solution of phosphoric acid can be obtained. If it is desired to produce a derivative of phosphoric acid, a suitable solid base or an aqueous solution thereof may be used, for example, sodium hydroxide, potassium hydroxide, sodium carbonate, calcium hydroxide, etc., or ammonia, etc., to obtain phosphates free from titanium.

REFERENCE EXAMPLE 1

A $P_2O_5$ 30 wt. percent phosphoric acid (expressed as $P_2O_5$) solution containing 500 mg./l. of titanium (calculated in terms of $TiO_2$) was prepared in an amount of 100 ml., to which an extracting agent was added in an amount of 100 ml. The mixture was then shaken for 30 minutes at room temperature to reach equilibrium and thereafter was settled to obtain an extraction phase and a water phase. Subsequently, the concentration of the phosphoric acid and titanium (calculated in terms of $TiO_2$) in each of said two phases was analyzed to obtain the results shown in Table 3. As the extracting agent, use was made of the following: n-butanol, isoamylalcohol, n-hexanol and benzene.

TABLE 3

| Extracting agent | Partition coefficient of phosphoric acid, K | Phosphoric acid concentration in extraction phase (g./l.) | Titanium concentration in extraction phase, $TiO_2$ (mg./l.) | $TiO_2/100$ $P_2O_5$ |
|---|---|---|---|---|
| n-Butanol | 0.35 | 140 | 83 | 0.043 |
| Isoamyl-alcohol | 0.17 | 75 | 45 | 0.043 |
| n-Hexanol | 0.09 | 44 | 24 | 0.040 |
| Benzene | 0.00 | <0.1 | 0.00 | |

$$\text{Partition coefficient } K = \frac{\text{Phosphoric acid concentration in extraction phase}}{\text{Phosphoric acid concentration in water phase}}$$

From the results in Table 3, it is clear that the partition coefficient of phosphoric acid is greatest in the case of n-butanol and becomes smaller in the order of isoamylalcohol and n-hexanol, and that the ability to dissolve titanium also becomes smaller in the same order. Accordingly, the amount of titanium (calculated in terms of TiO₂) to 100 parts of P₂O₅ in the extraction phase does not differ much in all cases of the solvents, showing a numerical value of 0.04 or thereabout. Since the TiO₂/100 P₂O₅ required in pure phosphoric acid is less than 0.005, a satisfactory result was not obtained by mere solvent extraction.

Also, benzene is unsuitable as an extracting agent, since it, when used as such, actually did not dissolve the titanium, but dissolved the phosphoric acid in only an extremely negligible small amount.

EXAMPLE 1

A 30 wt. percent ($P_2O_5$) phosphoric acid solution containing 50 mg./l. of titanium (calculated in terms of $TiO_2$) was prepared six times, each time in an amount of 100 ml. Of these six phosphoric acid solutions, one without any iron compound added, was used as Sample No. 1, and the remaining five with FeCl₃, calculated as Fe, added as an iron compound in the respective amounts of 0.1 g., 0.25 g., 0.5 g., 1.0 g. and 2.0 g and dissolved therein were used as Samples No. 2, No. 3, No. 4, No. 5 and No. 6 respectively.

n-Butanol was then added in an amount of 100 ml. to each of these six samples and mixed therewith by shaking in a separating funnel, and thereafter the mixture was separated into an extraction phase and a water phase. Subsequently, the titanium concentration (calculated in terms of $TiO_2$) in each of said two phases was measured and the partition coefficient was calculated to obtain the results shown in Table 4.

TABLE 4

| Sample No. | Added Fe³⁺, g. | 1/K | Fe³⁺/TiO₂ (weight ratio) |
|---|---|---|---|
| 1 | 0 | 4.4 | 0 |
| 2 | 0.1 | 7.3 | 20 |
| 3 | 0.25 | 11.0 | 50 |
| 4 | 0.5 | 14.0 | 100 |
| 5 | 1.0 | 17.0 | 200 |
| 6 | 2.0 | 28.0 | 400 |

The value of 1/K in Table 4 above expresses the ratio of the titanium concentration in the water phase to the titanium concentration in the extraction phase, and it shows that the greater the numerical value, the more readily the titanium is dissolved in the water phase and the harder it is to dissolve it in the extraction phase.

From the results in Table 4, it became clear that, by the addition of $Fe^{3+}$, the partition coefficient of titanium into the butanol phase-water phase system is strikingly affected, and that, as the amount of $Fe^{3+}$ added increases, the more difficult it becomes to dissolve the titanium in the phosphoric acid into the extraction phase.

EXAMPLE 2

When ferric sulfate was used in place of the ferric chloride (FeCl₃) in Example 1, and the same operations were conducted, the same results were obtained as in Example 1.

REFERENCE EXAMPLE 2

In the experimental operation shown in Example 1, a divalent iron compound, ferrous sulfate (FeSO₄), was used in place of the ferric chloride (FeCl₃) to obtain the results shown in Table 5.

TABLE 5

| Sample No. | Added Fe²⁺ (g.) | 1/K |
|---|---|---|
| 1 | 0 | 4.4 |
| 2 | 0.1 | 4.3 |
| 3 | 0.5 | 4.4 |
| 4 | 1.0 | 4.5 |
| 5 | 2.0 | 4.6 |

From the results in Table 5, it is clear that, if a divalent iron ion coexists when the phosphoric acid containing titanium is solvent-extracted with n-butanol, the partition coefficient of the titanium is not affected. Accordingly, even though the divalent iron compound was added, no effect was observed.

REFERENCE EXAMPLE 3

With 5000 ml. of n-butanol added as an extracting agent to 1000 ml. of a wet-process phosphoric acid having the composition shown in Table 6, counter-current multi-stage extraction was carried out in a mixer-settler type of extracting apparatus. The extraction phase obtained was then contacted counter-currently with 1300 ml. of pure water to recover the phosphoric acid contained in the extraction phase, and thereby 1700 ml. of an aqueous solution of phosphoric acid were obtained. The operation was carried out at room temperature. The composition of the aqueous solution of phosphoric acid obtained was as follows:

Weight, percent
P₂O₅ _____ 15.2
TiO₂ _____ 0.013
SO₄ _____ 1.04

The amount of titanium (calculated in terms of $TiO_2$) in said aqueous solution of phosphoric acid was 0.085 parts to 100 parts of $P_2O_5$. This aqueous solution of phosphoric acid was concentrated to obtain a phosphoric acid having a white turbidity in the course of the concentration, which was unsuitable as an industrial phosphoric acid.

TABLE 6

Weight, percent
P₂O₅ _____ 31.2
SO₄ _____ 3.15
Ca _____ 0.19
TiO₂ _____ 0.05
Fe _____ 0.47

EXAMPLE 3

To 1000 ml. of the wet-process phosphoric acid shown in Reference Example 3, 21.9 g. of ferric chloride (FeCl₃·6H₂O) crystals were added and dissolved therein by stirring for about 30 minutes. By this operation, the weight ratio of the iron and titanium in the phosphoric acid solution became 100.

Then, with 5000 ml. of n-butanol as an extracting agent, a counter-current multi-stage extraction was carried out to obtain 5300 ml. of an extraction phase. In succession, this extraction phase was continuously treated counter-currently with 1300 ml. of pure water to obtain 1700 ml. of an aqueous solution of phosphoric acid.

The composition of this aqueous solution of phosphoric acid was 15.2% of $P_2O_5$ and 0.0005% of titanium (calculated in terms of $TiO_2$), this corresponding to 0.0033 part of titanium (calculated in terms of $TiO_2$) per 100 parts of $P_2O_5$.

The aqueous solution of phosphoric acid so obtained was concentrated to obtain 85% phosphoric acid, which, having formed no precipitate during the step of concentration, was fully satisfactory as an industrial phosphoric acid.

EXAMPLE 4

To 1000 ml. of the wet-process phosphoric acid shown in Reference Example 3, 16.1 g. of ferrous chloride (FeCl₂·4H₂O) crystal were added and dissolved therein by stirring for about 30 minutes. Hydrogen peroxide was then added to fully oxidize the divalent iron. By this operation, the divalent iron changed to a trivalent iron and the weight ratio of the iron and titanium (calculated in terms of $TiO_2$) in the phosphoric acid became 100.

Subsequently, with 8000 ml. of isoamylalcohol as an extracting agent, the counter-current multi-stage extraction was carried out in a mixer-settler type of extractor to obtain 8400 ml. of an extraction phase. In succession, this extraction phase was continuously treated counter-currently with 1300 ml. of pure water to obtain 1800 ml. of an aqueous solution of phosphoric acid.

The composition of this aqueous solution of phosphoric acid was 14.1% of $P_2O_5$ and 0.0004% of titanium (calculated in terms of $TiO_2$), this corresponding to 0.0028 part of titanium (calculated in terms of $TiO_2$) to 100 parts of $P_2O_5$.

The aqueous solution of phosphoric acid so obtained was concentrated to obtain 85% phosphoric acid, which, having formed no precipitate during the step of concentration, was fully satisfactory as an industrial phosphoric acid.

What is claimed is:

1. A process for preparing titanium-free phosphoric acid from impure wet process phosphoric acid containing titanium and the iron content thereof being in an amount less than that sufficient to produce a weight ratio of iron to $TiO_2$ in the acid of at least 20, said method comprising adding an iron compound to an impure wet process phosphoric acid and forming an $Fe^{3+}$ ion in said phosphoric acid, the iron compound being added in an amount sufficient to produce a weight ratio of $Fe^{3+}$ to $TiO_2$ in the acid of at least 20, adding an aliphatic alcohol as a solvent to the phosphoric acid, whereby the phosphoric acid is extracted into the alcohol phase while the titanium remains in the aqueous phase, and thereafter separating the phosphoric acid from the alcohol phase.

2. A process as claimed in claim 1, wherein the iron compound which is added to the impure wet process phosphoric acid directly forms $Fe^{3+}$ therein.

3. A process as claimed in claim 1 wherein the iron compound which is added to the impure wet process phosphoric acid, forms a divalent iron ion therein, the trivalent iron ion being formed by oxidizing the divalent iron ion by the addition of an oxidizing agent to the acid.

4. A process as claimed in claim 1, wherein said alcohol has three to six carbon atoms.

5. A process as claimed in claim 1, wherein the added iron compound is an inorganic trivalent iron salt.

6. A process as claimed in claim 1, wherein the aliphatic alcohol is n-butanol.

7. A process as claimed in claim 1, wherein the aliphatic alcohol is iso-n-amylalcohol.

8. A process as claimed in claim 1, wherein the extraction operation is carried out continuously.

9. A process as claimed in claim 1, wherein the phosphoric acid is recovered from the alcohol phase in the form of phosphate by reaction with a base.

10. A process as claimed in claim 9, wherein said base is selected from the group consisting of sodium hydroxide, potassium hydroxide, sodium carbonate, calcium hydroxide and ammonia.

11. A process as claimed in claim 1, wherein the phosphoric acid is recovered from the alcohol phase by stripping with water.

12. A process as claimed in claim 3, wherein air is used as the oxidizing agent.

13. A process as claimed in claim 3, wherein hydrogen peroxide is used as the oxidizing agent.

14. A process as claimed in claim 3, wherein the divalent iron compound is an inorganic salt.

References Cited

UNITED STATES PATENTS

| | | | |
|---|---|---|---|
| 1,929,441 | 10/1933 | Milligan | 23—165 |
| 3,131,993 | 5/1964 | Gustison et al. | 23—18 |
| 3,310,374 | 3/1967 | Posey et al. | 23—165 |

FOREIGN PATENTS 685,010  4/1964  Canada.

OTHER REFERENCES

Chem. Abstracts, vol. 66, 7309, 77824s (1967).

OSCAR R. VERTIZ, Primary Examiner

G. A. HELLER, Assistant Examiner

U.S. Cl. X.R.

23—312